United States Patent
Sandrew

(10) Patent No.: US 9,589,255 B1
(45) Date of Patent: Mar. 7, 2017

(54) COLLABORATIVE MEDIA CAPTURE AND SHARING SYSTEM

(71) Applicant: Engagement Media Technologies Inc., Carlsbad, CA (US)

(72) Inventor: Barry Sandrew, Carlsbad, CA (US)

(73) Assignee: GRAFFITI VIDEO INC., Carlsbad, CA (US)

( * ) Notice: Subject to any disclaimer, the term of this patent is extended or adjusted under 35 U.S.C. 154(b) by 0 days.

(21) Appl. No.: 15/265,599

(22) Filed: Sep. 14, 2016

(51) Int. Cl.
| | |
|---|---|
| G06F 15/16 | (2006.01) |
| G06Q 10/10 | (2012.01) |
| H04L 29/08 | (2006.01) |
| H04W 4/02 | (2009.01) |
| H04W 4/00 | (2009.01) |
| H04W 4/06 | (2009.01) |
| H04W 48/20 | (2009.01) |

(52) U.S. Cl.
CPC ..... *G06Q 10/1093* (2013.01); *H04L 67/1078* (2013.01); *H04L 67/18* (2013.01); *H04W 4/008* (2013.01); *H04W 4/021* (2013.01); *H04W 4/06* (2013.01); *H04W 48/20* (2013.01)

(58) Field of Classification Search
CPC ....... H04W 4/00; H04W 4/023; H04W 4/028; H04W 84/18
USPC ........................................................ 709/204
See application file for complete search history.

(56) References Cited

U.S. PATENT DOCUMENTS

| 8,810,454 | B2 | 8/2014 | Cosman | |
|---|---|---|---|---|
| 2013/0117266 | A1 | 5/2013 | Yahalom | |
| 2013/0227011 | A1* | 8/2013 | Sharma | G06Q 50/01 709/204 |
| 2016/0173625 | A1* | 6/2016 | Ruben | G06Q 50/00 709/204 |

* cited by examiner

*Primary Examiner* — Phuoc Nguyen
(74) *Attorney, Agent, or Firm* — ARC IP Law, PC; Joseph J. Mayo

(57) ABSTRACT

A system that enables a group to collaborate to capture and share media for an event. An organizer defines the time and location of an event, which establishes a geofence around the event area. Each event participant uses a mobile application that coordinates communication and sharing. The participants' devices form a mesh network with peer-to-peer links, for example over Bluetooth or Wi-Fi. Media, such as photos or videos, captured by a participant are shared over the mesh network. To accommodate low bandwidth peer-to-peer links, reduced-size media, such as thumbnails, may be shared. Participants may exchange messages and update peers on their locations. Locations may be determined using GPS, or by correlating camera images and 3D sensor data with a model of the event area. Media may be uploaded to a server and curated to form integrated media records of the event, such as a highlight reel or news feed.

20 Claims, 16 Drawing Sheets

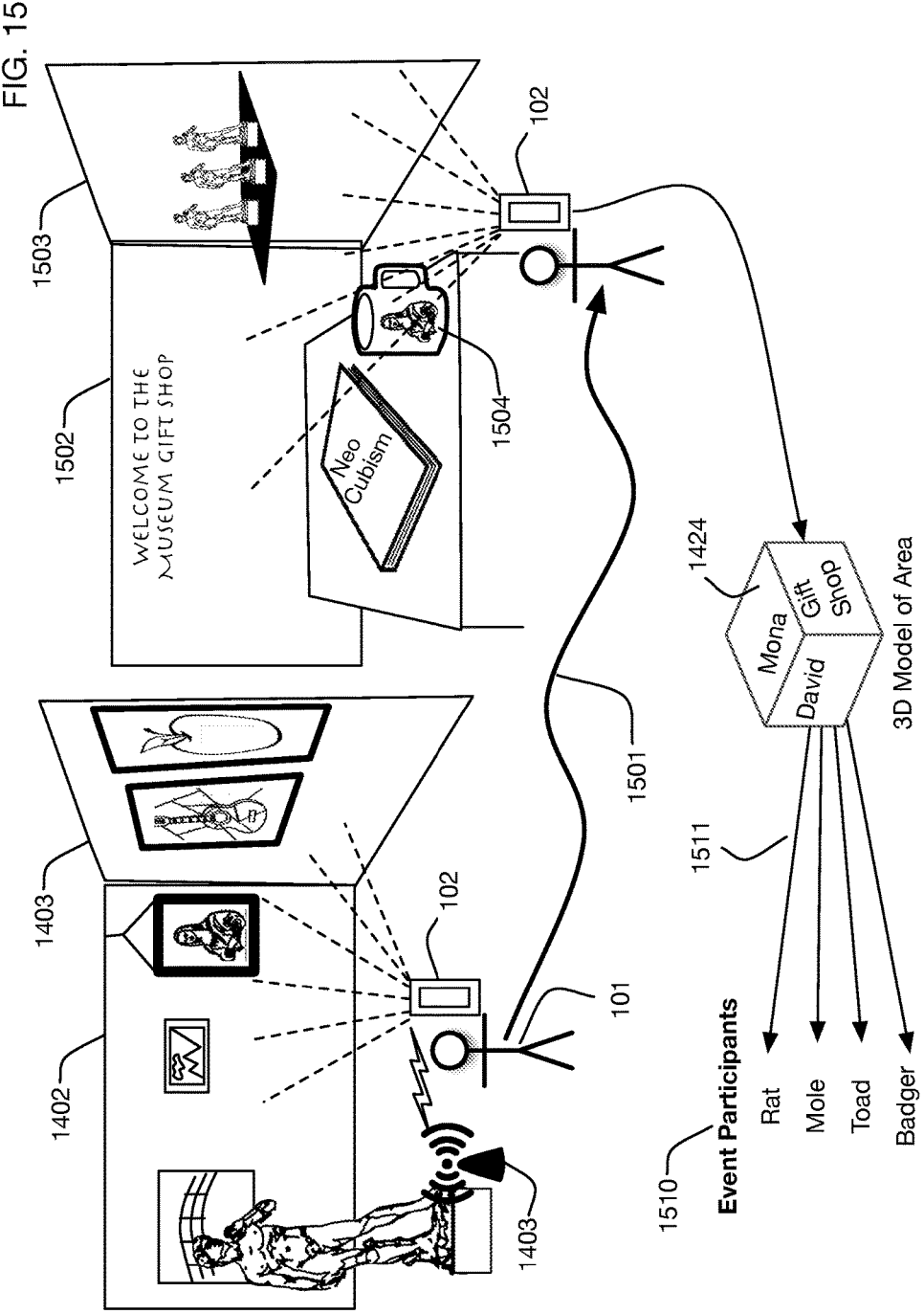

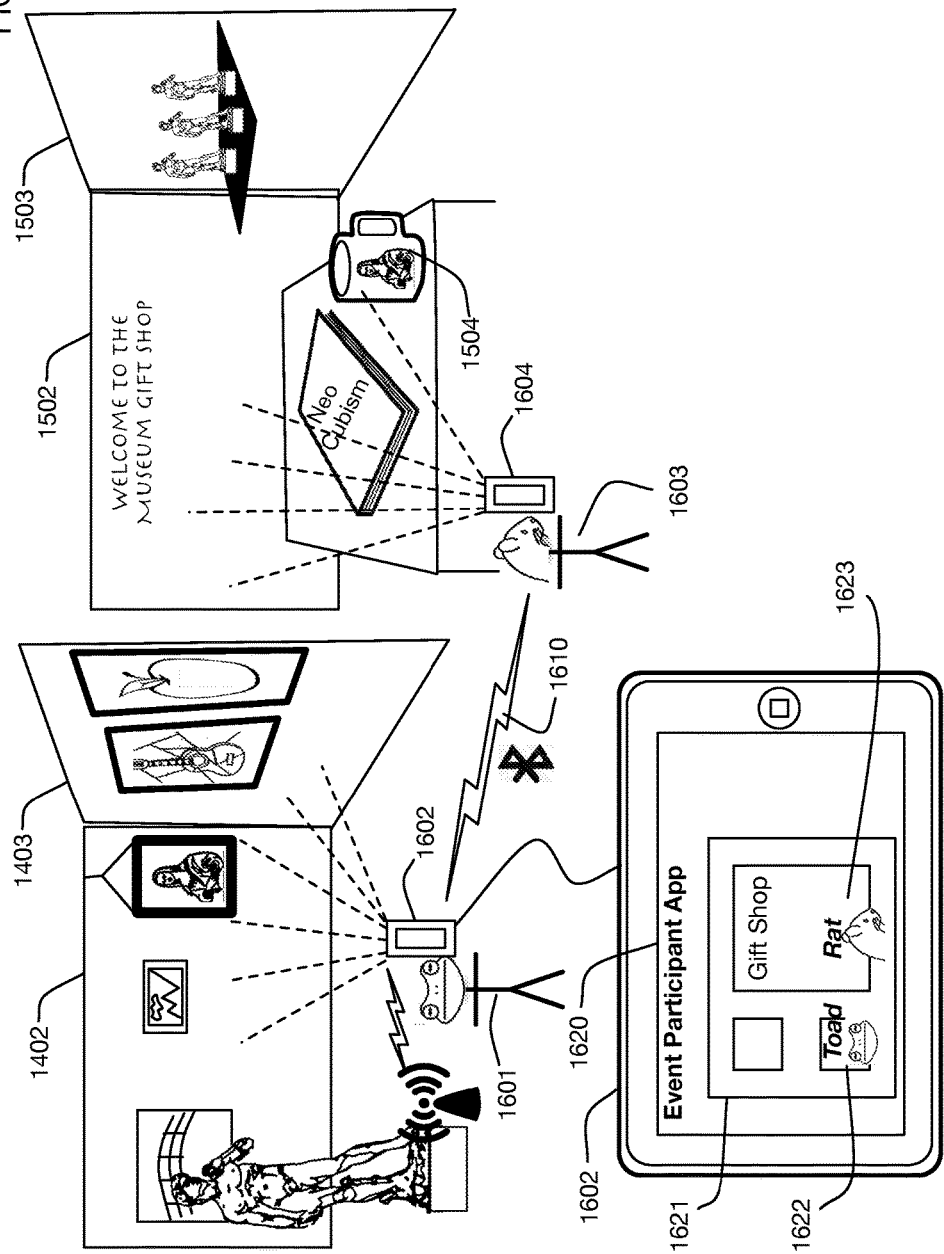

COLLABORATIVE MEDIA CAPTURE AND SHARING SYSTEM

BACKGROUND OF THE INVENTION

Field of the Invention

One or more embodiments of the invention are related to the field of device networking and communication. More particularly, but not by way of limitation, one or more embodiments of the invention enable a collaborative media capture and sharing system, which may for example use a mesh network among participants to coordinate activities and share media captures.

Description of the Related Art

Systems that allow users to share media captures, such as photos and videos, are known in the art. However, known systems require users to upload media captures to a centralized server for sharing, or to use a centralized service such as social media service to post or transmit information. Sharing via a centralized server or centralized service requires that all users have connections to these centralized systems, which is not always feasible or desirable. For example, mobile devices may not always be able to establish a reliable connection to a cellular service or other Internet access point. Sharing via a centralized server or centralized service also may not scale well, since the centralized server or service may become a bottleneck for large numbers of users. In addition, sharing via a centralized system may compromise privacy.

An additional limitation of existing sharing services is that they provide no capabilities for users to collaborate and communicate while the users are capturing media. Users who are trying to collectively document a group activity or event may therefore discover after the fact that they have duplicated their efforts, or that they have missed documenting certain important items.

For at least the limitations described above there is a need for a collaborative media capture and sharing system.

BRIEF SUMMARY OF THE INVENTION

One or more embodiments described in the specification are related to a collaborative media capture and sharing system. Embodiments of the system coordinate information transfer among a group of users participating in an event. The system may designate one or more event organizers who use an event organizer application executing on an event organizer station. The organizer application may be used to describe an event, including for example the location and time of the event, and transmit this information to a group of event participants. Each event participant may use an event participant application executing on an event participant station. The event participant application receives and displays event notifications. During the event, event participant stations within the event area form a mesh network via peer-to-peer links between stations. This mesh network may be used to transfer messages, alerts, and media captures among participants. Participant applications may determine the location of the participant using various technologies such as GPS, 3D sensors, and beacons, and may share their locations with other participants. Event participant applications may be used to capture media records for the event; these media records may be tagged with information such as the location and time of the capture, and the identity of the participant who initiated the capture. Media records and tags may be stored locally on the participant stations, and may be shared across the mesh network with other participants. In some situations, a representation of a media record, such as for example a thumbnail, may be shared and displayed instead of the full-size media record.

One or more embodiments of the system may be used for any type of event, including for example, without limitation, a wedding, a concert, a political protest, a search and rescue operation, a criminal activity, an emergency, a natural phenomenon, a law enforcement operation, a military operation, a sporting event, a trip, a vacation, an outing, a field trip, a party, a fair, a festival, a rally, a riot, a geocaching game, a farmer's market, a trade show, a conference, a convention, and a meeting.

Media records captured and shared by embodiments of the system may include any type of media, including for example, without limitation, a photo, a panorama, a video, an audio recording, a 3D scan, a 3D photograph, and a 3D video.

Mesh networks formed between participant stations in one or more embodiments of the system may use links of any type between stations, including for example, without limitation, Wi-Fi links and Bluetooth links, with any application including chat or any other messaging solution. Mesh networks may also include other nodes in addition to participant stations, such as for example beacons or fixed nodes within an event area.

In one or more embodiments of the system, a participant application may share its location with other participants over the mesh network, and it may display the locations of the other participants received over the mesh network. A participant application may display a notification when a new participant enters the event area, or when a participant leaves the event area.

One or more embodiments may provide messaging capabilities for event participants to send messages to one another over the mesh network. Messages may be broadcast to all event participants, or sent to a specified list of participants. One or more embodiments may provide a panic message capability whereby a participant may generate a panic message requesting immediate assistance. The panic message may be sent to all participants, or to participants closest to the participant requesting assistance.

In one or more embodiments participant applications may receive and display information from points of interest in or near the geographic area of the event. Information may be displayed for example when a participant is at or near the point of interest. Points of interest may include for example, without limitation, a restaurant, a bar, a café, a pub, a food truck, a grocery store, a retail shop, a gallery, a spa, a museum, a historical landmark, a monument, and a geographic feature. Information displayed for the point of interest may include for example, without limitation, an advertisement, a promotion, a discount, a reward, a bonus, and a gift.

In one or more embodiments, representations of media captures shared with other participant applications may contain reduced-size versions of the media, such as for example, without limitation, a clip or frame selected from a video, a thumbnail of a video frame, a reduced resolution or black and white version of a photo, or a reduced fidelity version of an audio capture. Participant applications may provide a feature to request a full-size version of the media from the participant station that made the original capture.

In one or more embodiments participant applications may upload media captures and descriptive tags to one or more servers. The participant applications in the mesh network may determine which participant stations have the best connections to the server, and media may be forwarded to these stations for upload to the server. One or more embodiments may include a curation application executing on a curation station, which may access media records on a server. The curation application may for example provide editing or selection capabilities to construct integrated media records for the event that may combine media captured by different participants.

One or more embodiments may include one or more event coordinators who use event coordinator applications to coordinate the activities and media captures of the event participants. Event coordinator applications may for example connect to the mesh network, receive and display media captured during the event, and provide messaging capabilities to send directives for additional media capture to the participants. These directives may identify for example, without limitation, a region or location within said geographic area for which additional media capture is desired, a person or group of persons for which additional media capture is desired, a topic for which additional media capture is desired, an angle or perspective of a location or person for which additional media capture is desired, and a media type for which additional media capture is desired.

In one or more embodiments participant stations may incorporate or couple with hardware and software that provide data that may be used to calculate the participant's location. In one or more embodiments this hardware and software may include for example a GPS receiver. In one or more embodiments this hardware and software may include for example one or more motion sensors, such as inertial motion sensors. One or more embodiments may obtain data on the vicinity of the participant using for example cameras, 3D sensors, or beacon signals. This data may be correlated with a 3D model of an event area to determine the participant's location within this area. The 3D model may be obtained for example from a server, from the event organizer, or from an access point within the event area when the participant arrives in the area. Use of cameras, 3D sensors, and beacons may be particularly effective in indoor environments, where GPS for example may not always be available, reliable, or accurate.

In one or more embodiments a 3D model of an event area may be generated by the event organizer. For example, the event organizer may capture images or 3D sensor data of an event area, potentially from various locations and orientations, and the event organizer application may generate the 3D model using this information. In one or more embodiments the event organizer application may distribute the 3D model of the event area to the event participants, for example with the information describing the event. Event participants may then use the 3D model to determine their location within the event area, using for example cameras, 3D sensors, or beacon signal receivers on the event participant stations. Event participants may share their locations over the mesh network. Event participant applications may display a map or other representation of the 3D model of the event area, and may display the location of each participant on this map or representation.

BRIEF DESCRIPTION OF THE DRAWINGS

The above and other aspects, features and advantages of the invention will be more apparent from the following more particular description thereof, presented in conjunction with the following drawings wherein:

FIG. 15 shows an embodiment of the system where the event organizer generates a 3D model of the event area, using for example cameras and 3D sensors on the organizer station.

FIG. 16 continues the example of FIG. 15, and illustrates event participants in an indoor event area determining their location relative to the 3D model sent by the event organizer, and sharing these locations with other event participants.

DETAILED DESCRIPTION OF THE INVENTION

A collaborative media capture and sharing system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
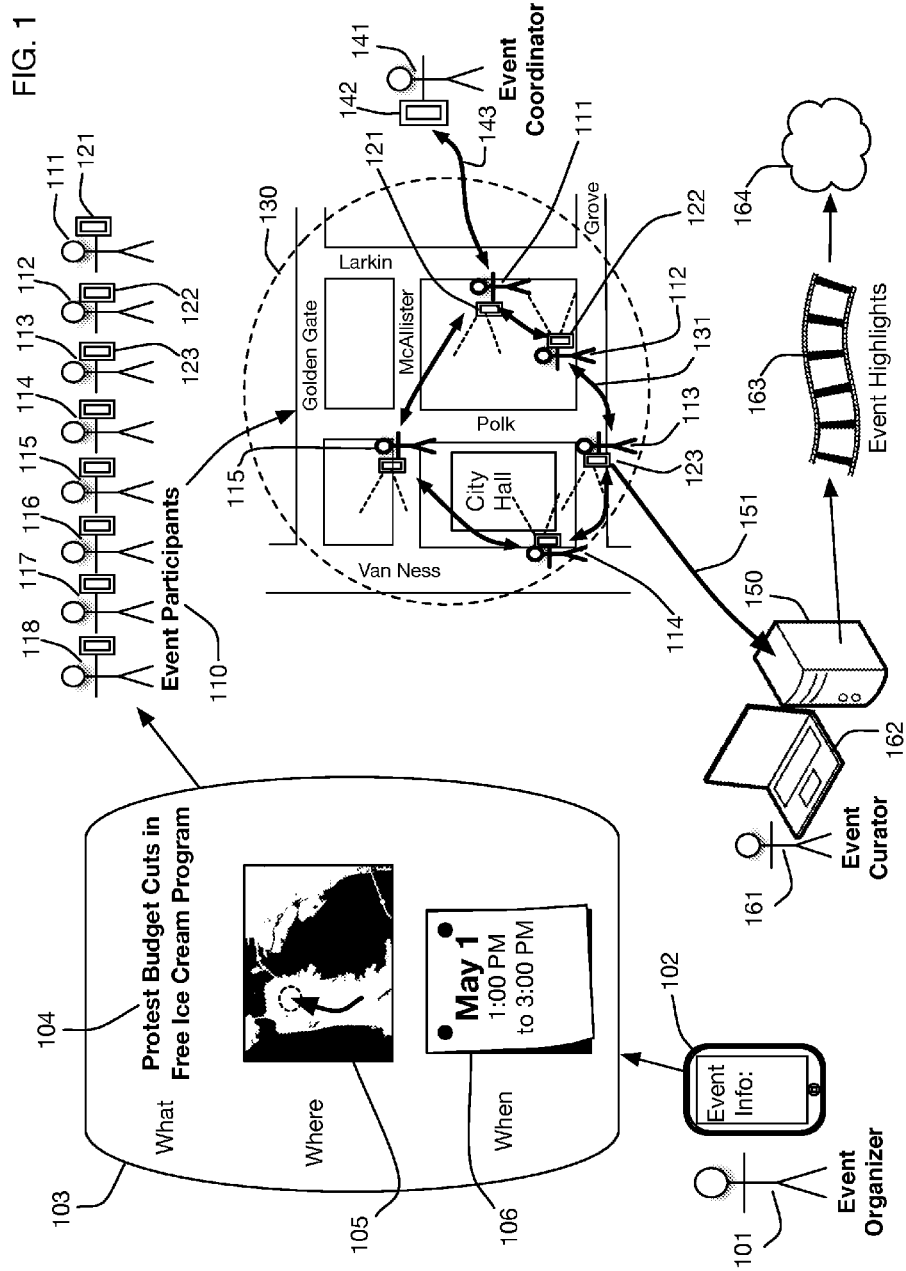
FIG. 1 shows an overview of the actors, equipment, and information flows in an embodiment of the system.

FIG. 1 shows an overview of an embodiment of a collaborative media capture and sharing system. This figure shows illustrative actors, hardware, and information flows; details of the components are described below and are illustrated in other figures. Event organizer 101 may initiate the media capture and sharing process by defining and describing an event. The organizer 101 uses event organizer station 102, which may be any computing device such as for example, without limitation, a computer, a laptop computer, a desktop computer, a mobile device, a smart phone, or a tablet computer. The system may include an event organizer application that executes on organizer station 102. The event organizer defines and describes the event and transmits an event notification to one or more event participants 110. This notification may be transmitted using any type or types of networks and protocols. The event notification 103 may include any information about the event. For illustration, in the example shown in FIG. 1 the event notification 103 provides a description 104 for the event, a location 105 for the event, and a date and time 106 for the event. In one or more embodiments the event notification may contain other information or different information. In one or more embodiments there may be multiple event locations and multiple event times. In one or more embodiments the event may be periodic, continuous, or ongoing. In one or more embodiments an event organizer may define an event after it has occurred or after it has started, and the notification for example may inform participants that they should upload any media they have already captured for the event.

The event defined and described by the event organizer 101 may be any type of event, including for example, without limitation, a wedding, a concert, a political protest, a search and rescue operation, a criminal activity, an emergency, a natural phenomenon, a law enforcement operation, a military operation, a sporting event, a trip, a vacation, an outing, a field trip, a party, a fair, a festival, a rally, a riot, a geocaching game, a farmer's market, a trade show, a conference, a convention, and a meeting. The event participants may take any role or roles in any of these events. For some events the event participants may be the entire set of attendees for the event; for some events the event participants may attend along with others who are not explicitly part of the invited group 110. For example, the event participants 110 may be informed of the event so that they may attend and collect observations, acting in effect as an ad hoc news gathering team or documentary team.

One or more of the event participants 110 may attend the event by entering the geographic area defined for the event during the time range 106 defined for the event. The geographic area defined for the event may for example have a boundary or geofence 130 that surrounds the event area. For illustration, in FIG. 1 the participants 111, 112, 113, 114, and 115 are on site at the event. Each event participant has an event participant station, which may include for example one or more mobile devices that he or she carries, wears, or otherwise accesses during the event. For example, participant 112 has event participant station 122, which may be for example a mobile phone or a tablet, that he or she takes to the event. The event participant stations may incorporate location detection hardware and software, so that the participant stations can determine when they cross the geofence 130 to enter the event area or to leave the event area. Location detection may use for example, without limitation, GPS, cell-tower assisted GPS, motion detection, triangulation using beacons or other signals, recognition of a scene or area using cameras or 3D sensors, or combinations of any of these technologies and methods. These event participant stations may each have an event participant application installed on them. This event participant application coordinates the communication among the event participants during the event. Event participant applications for the participants within the geographical boundary 130 of the event area coordinate to form a mesh network among the participant stations. This mesh network may connect participants using peer-to-peer links between their participant stations, such as link 131 between event participant station 122 used by participant 112, and event participant station 123 used by participant 113. Information may be passed from any participant to any other participant using this mesh network, possibly across multiple peer-to-peer links. The use of peer-to-peer links between participants for communication provides several potential advantages over communication via centralized hubs or gateways (such as cell phone towers or Internet access points), including robustness, scalability, and privacy.

Participant stations may be equipped with media capture hardware and software, such as for example, without limitation, cameras, video cameras, microphones, and 3D sensors. Participants may use the participant applications to capture and share media using the capabilities of the participant stations. In one or more embodiments separate devices such as standalone cameras may be used instead of or in addition to media capture hardware integrated into the participant stations, and these devices may communicate with the participant applications for sharing of captured media.

For some events and in some embodiments, one or more event coordinators may be designated. An event coordinator may for example communicate with event participants during the event to orchestrate the collection of media documenting the event. For some events this role may be played by one or more of the event participants. In the example illustrated in FIG. 1, event coordinator 141 has an event coordinator station 142, which may be for example a mobile phone or a tablet, or any other computing device. During the event, the coordinator station 142 communicates with the event participant stations. For example, the coordinator station 142 may join the mesh network linking the event participants. In FIG. 1, coordinator station 142 establishes a link 143 to event participant station 121 used by event participant 111, thereby accessing the entire mesh network that joins all event participants. In one or more embodiments the event coordinator or coordinators, if any, need not necessarily be in the geographical area for the event.

In one or more embodiments, media captured by event participants may be transmitted to one or more servers. For example, in the example of FIG. 1 media are sent to server 150. Typically (although not necessarily) the server may be outside the geographical boundary 130 for the event; for example, it may be a remote server accessible via the Internet. Transmission of media from event participants therefore may require a connection or connections from the local mesh network to a gateway or external network in order to access the server. In FIG. 1 connection 151 links participant station 123 to the server 150. Media from all event participants may be sent to the server by sending the media to participant station 123 over the mesh network; station 123 then forwards the media over link 151 to server 150.

Media captured by event participants may be sent to any servers, websites, databases, blogs, archives, or publication services. For example, without limitation, media may be published to social media sites associated with one or more of the participants. In one or more embodiments an event curator 161 may access the media sent to a server, and may select, edit, organize, and integrate media on the server to document the event. Event curator 161 may use an event curator station 162, which may be any computing device that can access server 150. In one or more embodiments the curator station 162 and the server 150 may be physically separated; for example, the curator station 162 may access the server 150 via an Internet connection. One or more embodiments may have several event curators, each accessing one or more servers to which media captures have been uploaded.

Event curator 161 may use event curation station 162 to generate event highlights 163. The highlights 163 may contain any selection or combination of media from server 150. Event highlights may combine, select, filter, organize, arrange, or edit media into any formats including for example, without limitation, montages, galleries, play lists, highlight video reels, or news feeds. In one or more embodiments curation of event media may occur real time while the event is occurring, generating for example a continuous news feed of event highlights.

The embodiment of FIG. 1 illustrates several possible actors associated with the system: event organizers, event participants, event coordinators, and event curators. In one or more embodiments some of these actors may not be present. In one or more embodiments some or all of these actors may be combined; for example, a single person may play the role of an event participant, an event coordinator, and an event curator. In one or more embodiments the applications that support the different actor roles may be combined. In one or more embodiments any of the actor types may be present in any numbers; for example, there may be multiple event organizers or multiple event curators.

Figure 2:
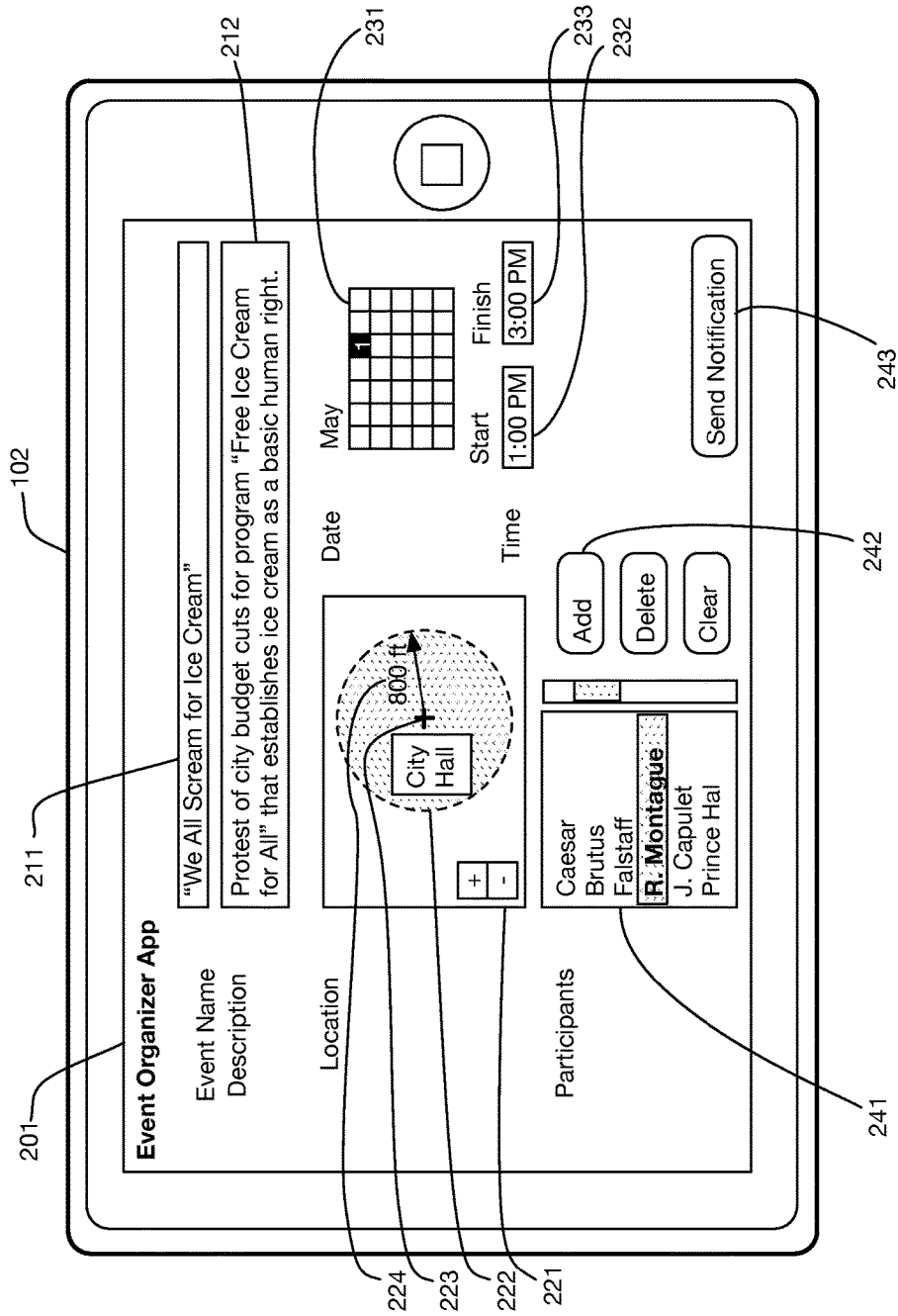
FIG. 2 illustrates an embodiment of an event organizer application that may be used by an event organizer to define an event.

FIG. 2 shows an illustrative user interface screen for an embodiment of an event organizer application that may be used by an event organizer. This application 201 executes on event organizer station 102, shown for illustration as a tablet or a mobile phone device. The application has field 211 for a name for the event, and field 212 for a description for the event. The event organizer may define the location for the event using for example a map control 221; for example, the organizer may define a boundary 222 around the event area by designating a center location 223 of the event area and by specifying a radius 224 around this center 223. In one or more embodiments the center location 223 may be the current location of the event organizer. In one or more embodiments the event location may be defined by drawing a boundary around an event area, for example using any type of drawing tool. The boundary may be any shape, including but not limited to a circle. In one or more embodiments the event area may include multiple regions. The event organizer may define the date and time for the event using for example controls 231, 232, and 233. In one or more embodiments the event stop time may be omitted if the event is ongoing. In one or more embodiments the event may be periodic, and the user interface for the organizer application may include controls to indicate repetitions or frequency of the event. The event organizer may also designate one or more event participants using for example a list control 241 with editing controls such as 242. In one or more embodiments participant lists may be linked to contact lists or any other databases of potential participants. Having defined the participants, the organizer may use control 243 to transmit the event notification to the participants.

Figure 3:
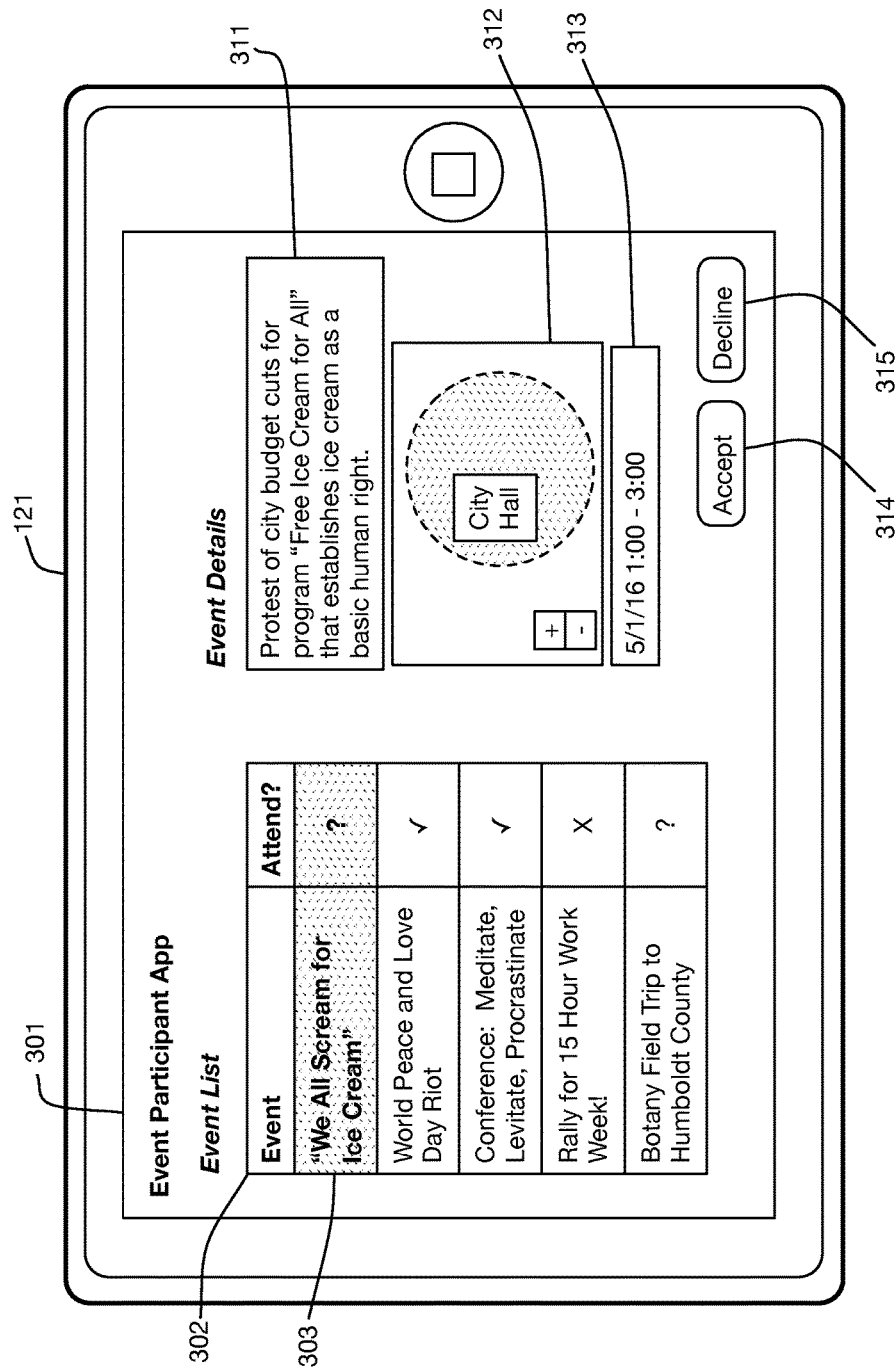
FIG. 3 illustrates an embodiment of an event listing screen of an event participant application, which is used by an event participant to track upcoming events.

FIG. 3 shows an illustrative user interface screen 301 for an embodiment of an event participant application that executes on an event participant station 121. As described below, an event participant application may provide several different functions and features; the screen 301 shown in FIG. 3 illustrates an event overview screen that the participant may use to manage upcoming events. The event participant application may receive notifications such as notification 103 in FIG. 1, and may generate a user interface such as 301 based on these notifications. The user interface may contain an event list 302 that shows a summary of upcoming events. When the user selects a specific event such as event 303, details for this event may be displayed, including for example the description 311, the location 312, and the date and time 313. The application may provide controls such as 314 and 315 for the event participant to respond indicating whether he or she intends to attend the event; these responses may for example be transmitted to the event organizer or to other potential event participants.

Figure 4:
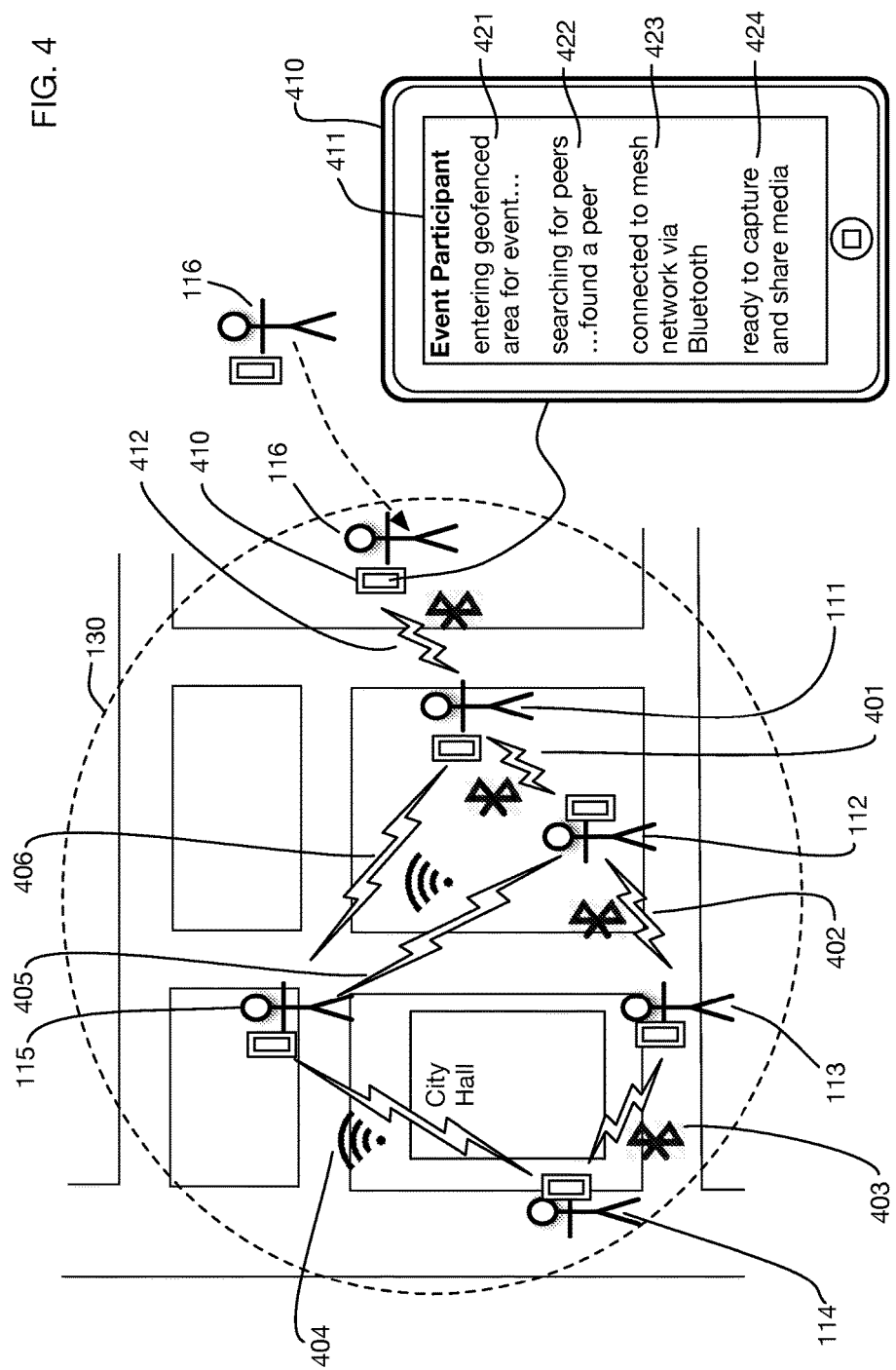
FIG. 4 shows an embodiment of the system with several event participants attending an event, and it illustrates a mesh network established between participants using peer-to-peer Wi-Fi and Bluetooth links.

FIG. 4 shows an example of the formation of a mesh network among event participant stations using peer-to-peer links. In this illustrative example, peer-to-peer links may be Bluetooth wireless links or Wi-Fi wireless links. In one or more embodiments event participant stations may use peer-to-peer links over any desired channels or networks, using any desired protocols. In one or more embodiments event participant stations may use peer-to-multipeer links or any other network topology. In the example of FIG. 4, event participant 111 is linked to event participant 112 via Bluetooth link 401; event participant 112 is linked to event participant 113 via Bluetooth link 402; and event participant 113 is linked to event participant 114 via Bluetooth link 403. Event participant stations may also be linked via Wi-Fi connections, either pure peer-to-peer Wi-Fi connections or connections via Wi-Fi access points to a shared Wi-Fi network. For example, event participant 114 is linked to event participant 115 via Wi-Fi link 404; event participant 115 is linked to event participant 112 via Wi-Fi link 405; and event participant 115 is linked to event participant 111 via Wi-Fi link 406. As illustrated in FIG. 4, participant stations may have links to any number of other participant stations; for example, event participant 115 has three Wi-Fi links to other stations.

FIG. 4 illustrates a new event participant joining the mesh network when the participant enters the geographical area 130 of the event. Participant 116 is initially outside the event area, and then crosses the boundary 130 to enter the event area. The participant application 411 executing on the participant station 410 for participant 116 first detects at 421 that the participant has entered the event area. It then attempts to join the mesh network by searching 422 for a peer. For example, nodes in the vicinity may advertise their presence with broadcast messages so that the application 411 can locate a peer. The application locates peer 111 and establishes a Bluetooth link 412 to this peer; it is then connected 423 to the mesh network. At this point the application indicates 424 that it is ready to capture and share media over the mesh network.

Figure 5:
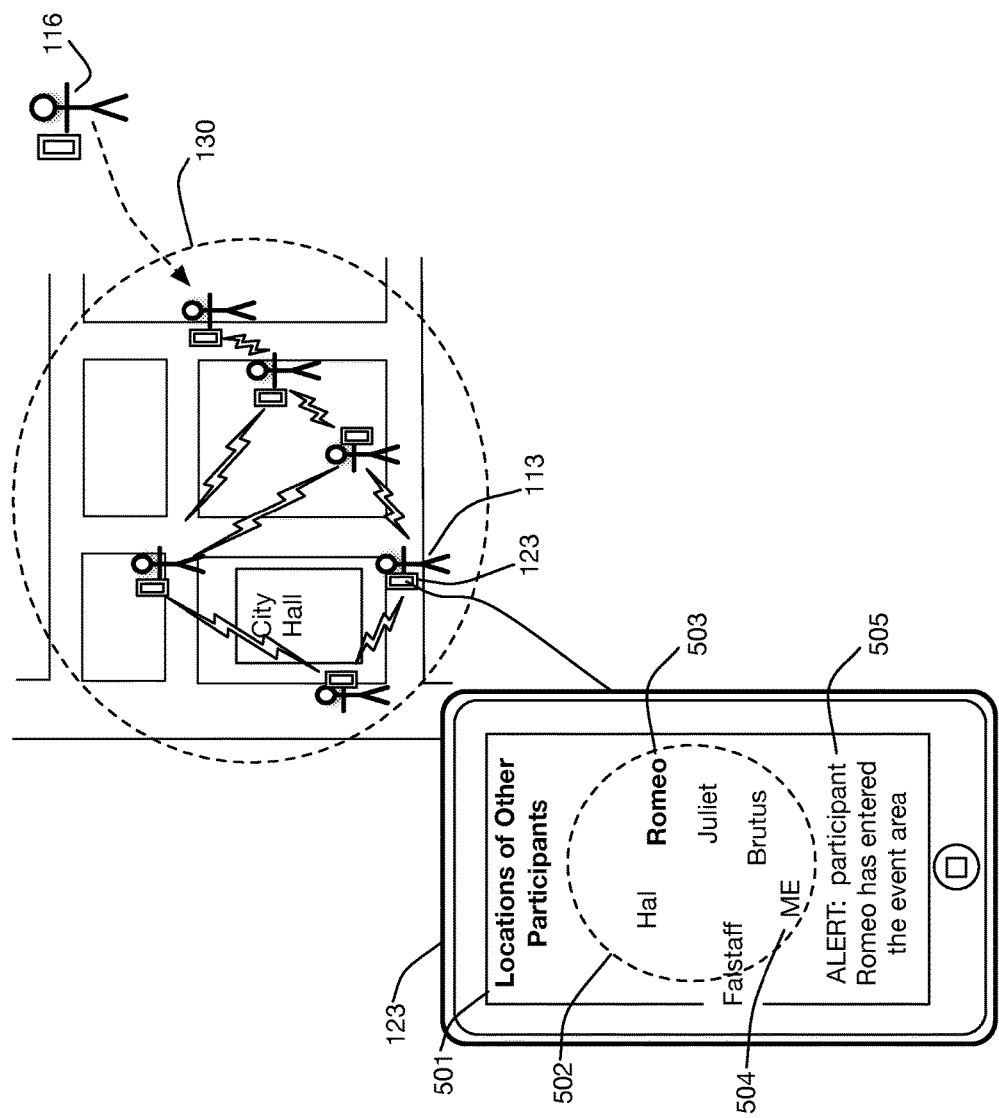
FIG. 5 illustrates an embodiment of an event participant application that shows the location of all other event participants, and that provides notifications when participants enter or leave the event area.

In one or more embodiments participant applications may display the location of one or more other participants. For example, each participant station may be equipped with a GPS or other location detecting device, and may share its location over the mesh network with other participants. FIG. 5 shows an example user interface 501 for a participant application executing on participant station 123 used by participant 113. This user interface 501 shows the location of other participants on a map 502. It also shows the location of the participant 504. When a new participant 116 enters the event area 130, the participant application 501 displays a notification 505 indicating that the new participant has arrived, and it shows the location 503 of the new participant. One or more embodiments may provide similar notifications when participants leave the event area. In one or more embodiments a participant may identify a specific set of other participants to track, and may be notified when any of these tracked participants enter or leave the event area or enter or leave a defined subregion of the event area. In one or more embodiments a participant may be notified when another participant arrives within a selected distance of the participant.

Figure 6:
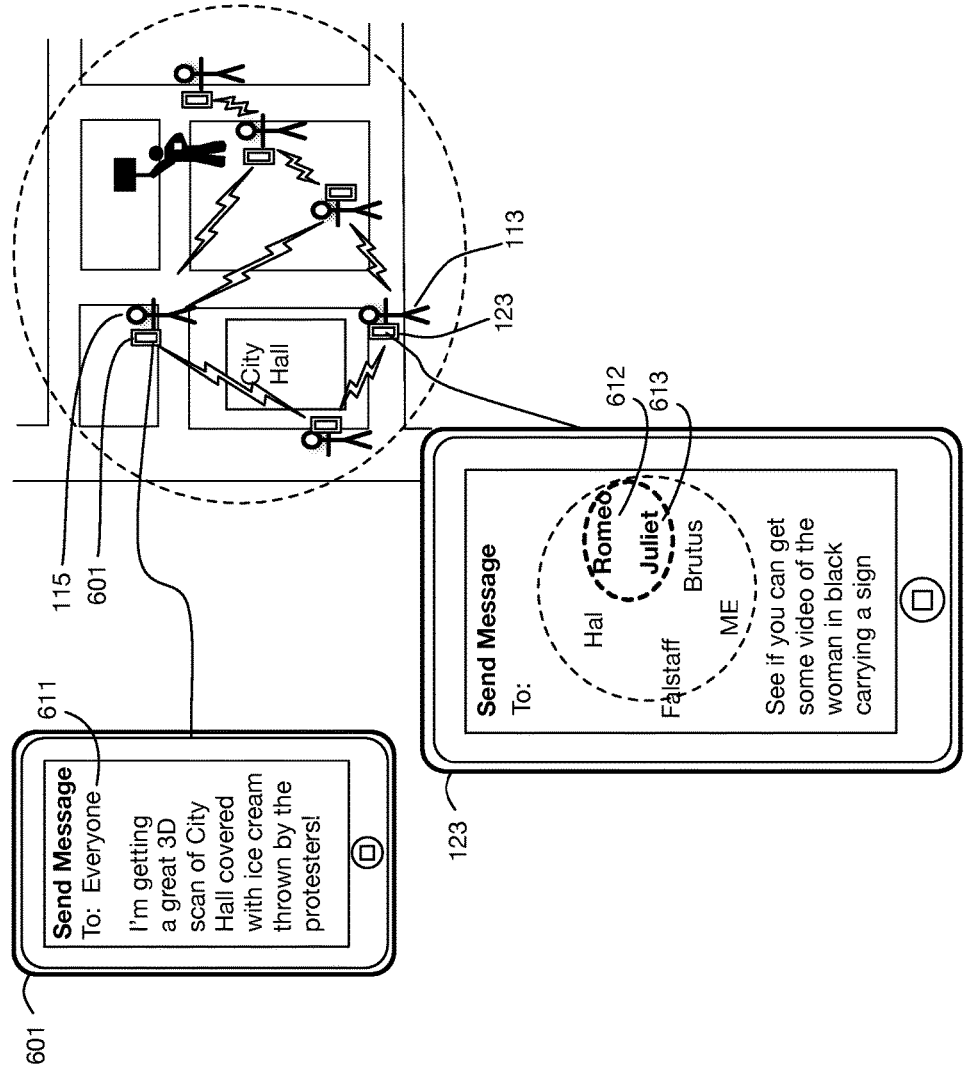
FIG. 6 illustrates an embodiment of an event participant application that provides messaging among event participants.

One or more embodiments may provide messaging capabilities in participant applications that allow participants to exchange messages over the mesh network. Messages may be broadcast to all participants, or sent to selected participants, groups, or distribution lists. For example, in FIG. 6 participant 115 with participant station 601 transmits a message to the broadcast address 611 of all participants. Participant 113 with participant station 123 selects two recipients 612 and 613, in this case using a map control to select participants in or near a particular region, and sends a message only to those recipients. One or more embodiments may provide capabilities for participants to exchange messages that include any media types, such as for example audio and images in addition to text.

Figure 7:
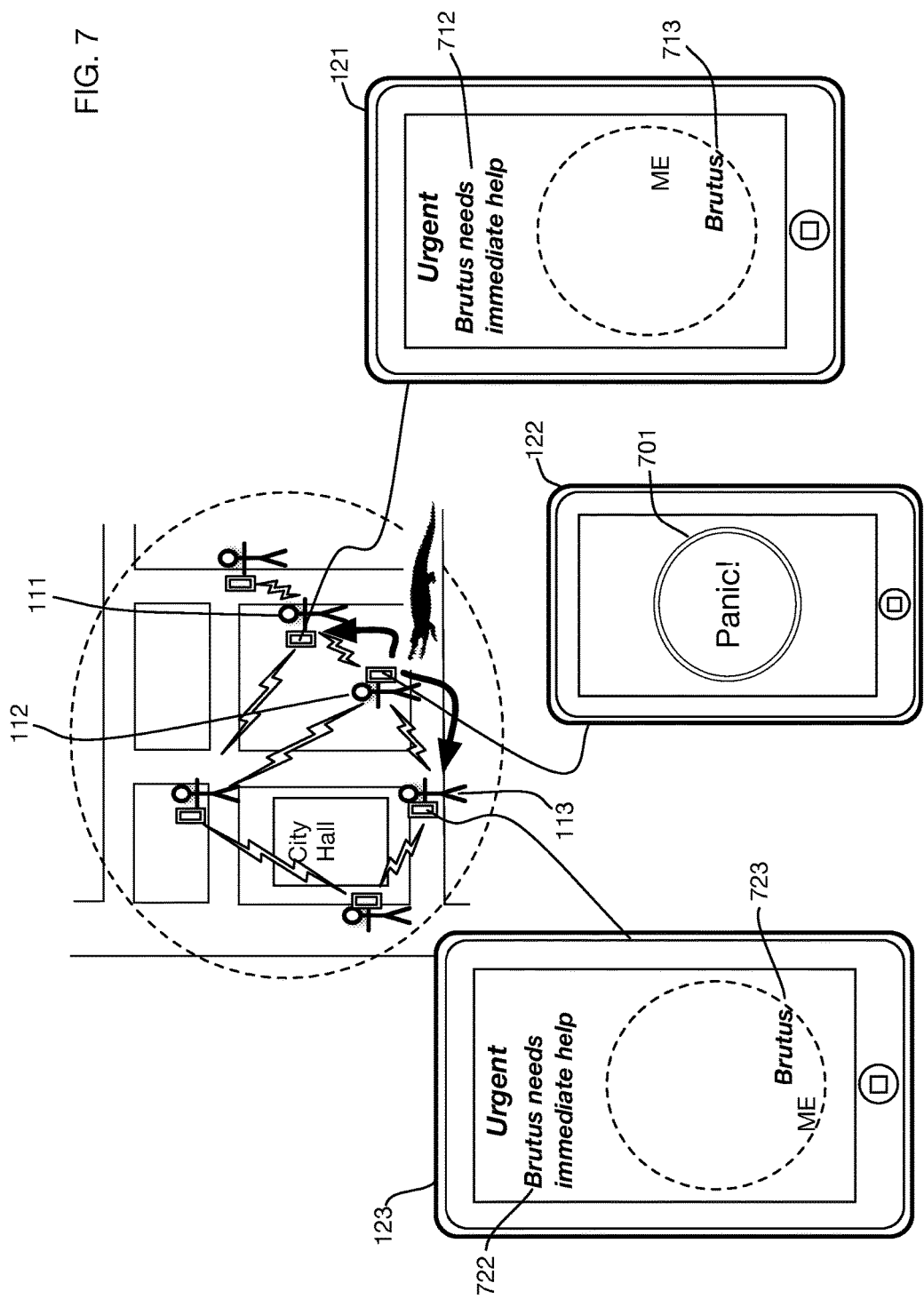
FIG. 7 illustrates an embodiment of an event participant application that provides a panic button that a participant can use to send an emergency request for assistance to other nearby participants.

In one or more embodiments a participant may be able to send a panic message to one or more other participants, indicating for example that the participant has an urgent need for assistance. FIG. 7 illustrates an example where participant 112 with participant station 122 sends a panic message using panic button 701 on the participant application. In one or more embodiments the panic message may be sent to all event participants, or it may be sent to specific participants such as those who are closest to the sender. In the example of FIG. 7, the message is sent to the closest other participants, 111 and 113. Both participants receive the alert indicating that participant 112 needs assistance. Participant 111 using participant station 121 receives alert 712, and the participant application also shows the location 713 of the participant requesting assistance. Similarly, participant 113 using participant station 123 receives alert 722, and the participant application shows the location 723 of the participant requesting assistance. In one or more embodiments a panic message may contain additional information, such as for example a text message or voice message entered by the participant requesting assistance.

Figure 8:
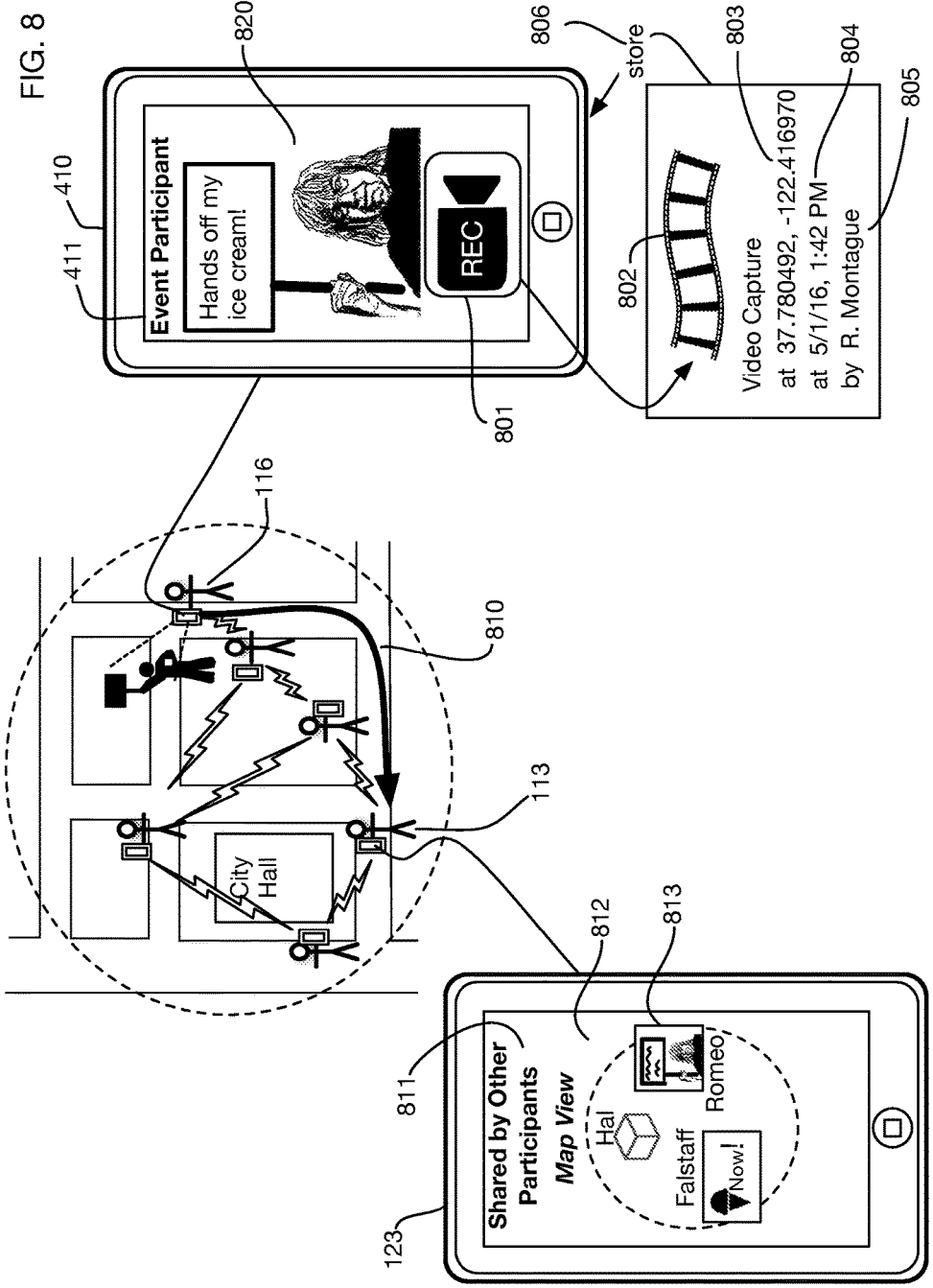
FIG. 8 shows media capture and sharing with an embodiment of an event participant application.

In one or more embodiments a participant application may have controls to capture and share media. Media captures may include for example, without limitation, photos, panoramas, videos, 360-degree videos, virtual reality videos, audio captures, 3D scans, 3D videos, or 3D photos. Media capture may be performed by hardware and software of the participant station, by external devices that may be linked to the participant station, or by combinations thereof. FIG. 8 illustrates an embodiment in which event participant 116 using participant station 410 captures video during the event. The event participant application 411 may for example display the video frames such as 820 as they are captured, and provide controls such as control 801 for recording, saving, erasing, sharing, or replaying. The media capture 802 may be saved locally 806 on the participant station, for example in memory or in nonvolatile storage. In one or more embodiments the participant application may tag captured media with descriptive information, including for example, without limitation, the location 803 at which the media was captured, the date and time 804 at which the media was captured, and the identity 805 of the event participant who captured the media. These tags may also be saved 806 with the captured media.

Captured media along with the descriptive tags may be shared with one or more other participants over the mesh network connecting the participants. Because media may be large, particularly long videos for example, it may not be desirable or feasible to always share complete, full-size media over the mesh network. The peer-to-peer links may not have sufficient bandwidth to support automatic sharing of all media with all participants. Instead, in one or more embodiments participant applications may share reduced-size representations of some captured media with other participant applications. This capability is illustrated in FIG. 8 where participant application 411 transmits 810 a representation of the video capture 802 over the mesh network to participant 113. The participant application of the receiving station 123 displays a representation 811 of the media captured and shared by other participants. In one or more embodiments these displays may include or be based on the descriptive tags associated with the media, such as the location, time, and identity tags. For example, display 812 shows a map view of the media captured by other participants. A thumbnail 813 of one of the captured frames of video 802 is used as the representation for video 802 in this example. Each representation also lists the identity of the participant who captured the media. One or more embodiments may provide alternative or additional views of captured media, such as a timeline view for example, or a view that groups captured media by type, by theme, or by any other criteria. In one or more embodiments a representation of media captured by a participant may be any reduced-size version of the capture, such as for example, without limitation, a thumbnail, a single frame or a set of frames from a video, a clip from a video, a reduced resolution photograph, a black and white version of a color photograph, or a reduced fidelity version of an audio capture. One or more embodiments may share full-size versions of selected media, such as for example single photographs, but may share reduced-size representations of other media, such as for example videos.

Figure 9:
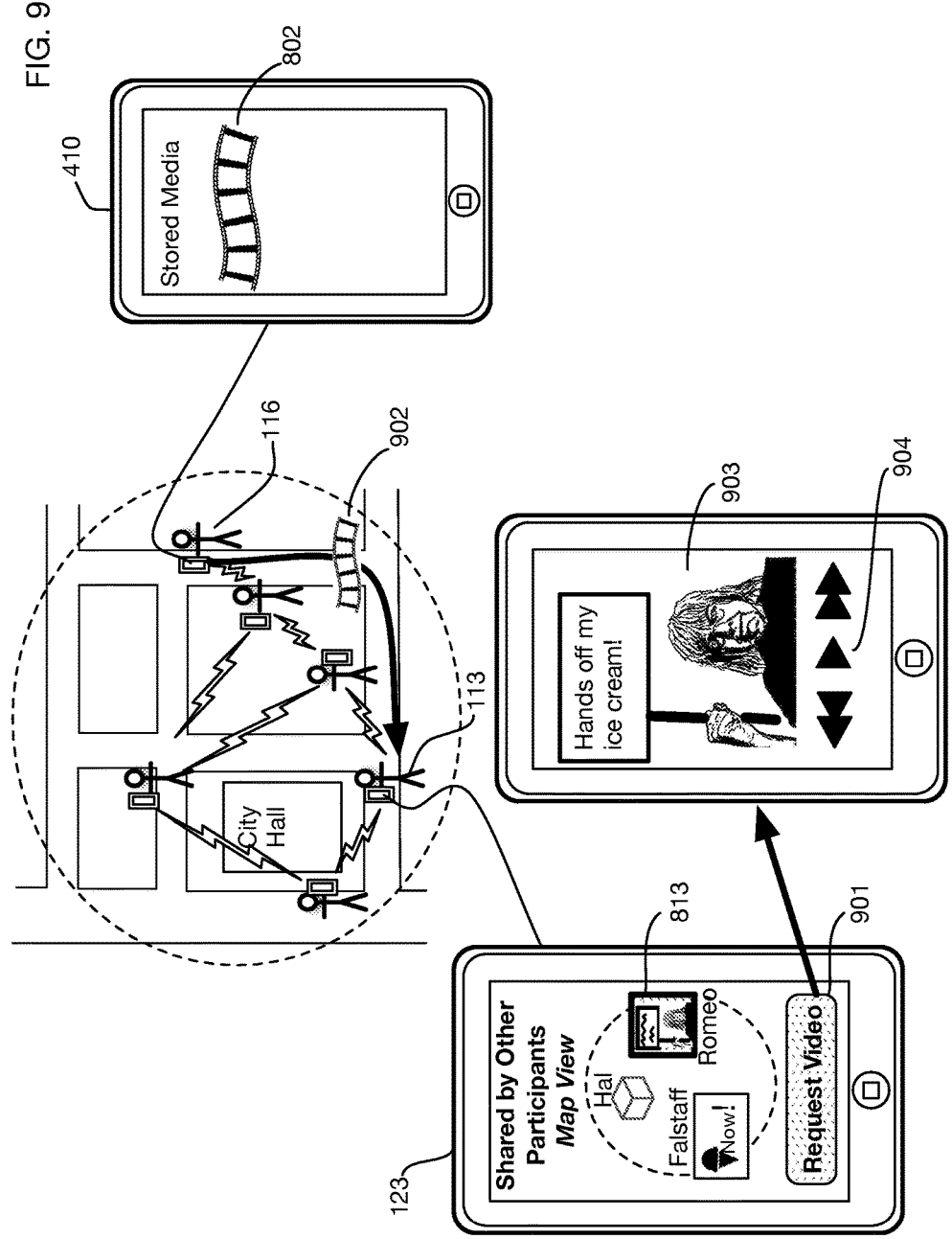
FIG. 9 continues the example shown in FIG. 8, showing one participant requesting a video captured by another participant after viewing a thumbnail from the video that was initially shared across the mesh network.

In one or more embodiments a participant application may be able to request a full-size (or more complete) version of a media capture if it initially received only a reduced-size representation. FIG. 9 continues the example of FIG. 8 to illustrate participant 113 requesting a full-size copy of the video captured by participant 116. Participant 113 selects the thumbnail 813 of the captured video, for example by tapping on it, and uses a control 901 to request the video. This request transmits a message to the participant application running on the participant station 410, which has a stored copy 802 of the entire video. The participant station 410 then transfers 902 the video across the mesh network to the requesting application, which displays the video 903, along with playback controls 904. The transfer 902 may be for example a stream or it may be a batch transfer of the entire video to the requesting participant application.

Figure 10:
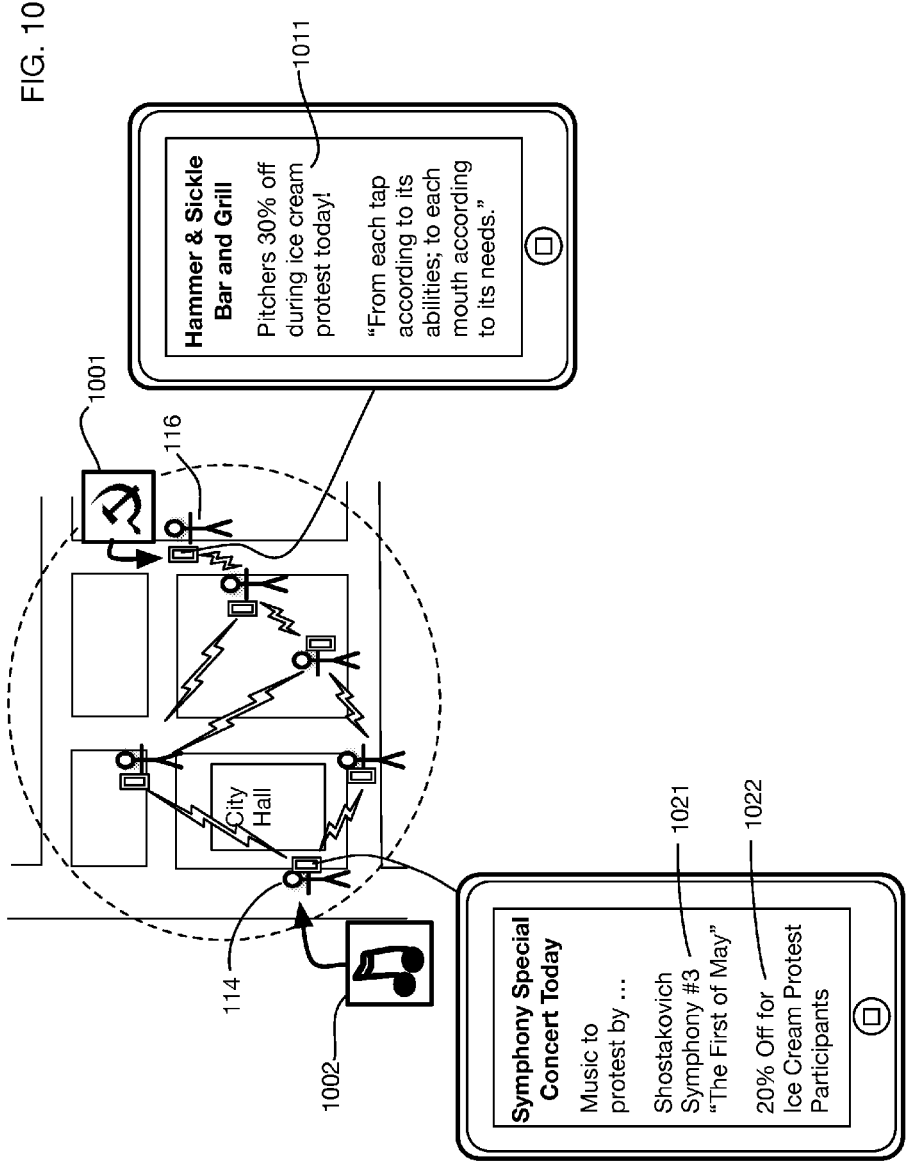
FIG. 10 shows an embodiment of the system that provides location-based information and promotions to participants that are near points of interest.

In one or more embodiments participant applications may receive information about points of interest in or near the event area, and may display this information to participants that are near these points of interest. FIG. 10 illustrates an example with two points of interest 1001 and 1002. The location of these points of interest may be determined by an event organizer, for example, or they may be obtained from beacons or from other location-based information services. Points of interest may include for example, without limitation, a restaurant, a bar, a café, a pub, a food truck, a grocery store, a retail shop, a gallery, a spa, a museum, a historical landmark, a monument, and a geographic feature. Participant 116 is near point of interest 1001; therefore, information 1011 associated with this point of interest is displayed on the participant application for this participant. This information 1011 includes a discount on a purchase associated with the event. Similarly, participant 114 is near point of interest 1002; therefore, information 1021 about the point of interest, as well as discount information 1022, are displayed on the participant application for this participant. Information displayed for a point of interest may include for example, without limitation, an advertisement, a promotion, a discount, a reward, a bonus, and a gift.

In one or more embodiments the distance between a participant station and a point of interest that triggers display of associated information may be configurable, or it may be transmitted along with the point of interest location and information. In one or more embodiments information about certain points of interest may be broadcast to all event participants regardless of the participants' locations. In one or more embodiments information about points of interest may be transmitted only at selected times or within certain time ranges. In one or more embodiments information about points of interest may be transmitted only to a selected subset of participants, such as for example participants in a particular demographic group.

Figure 11:
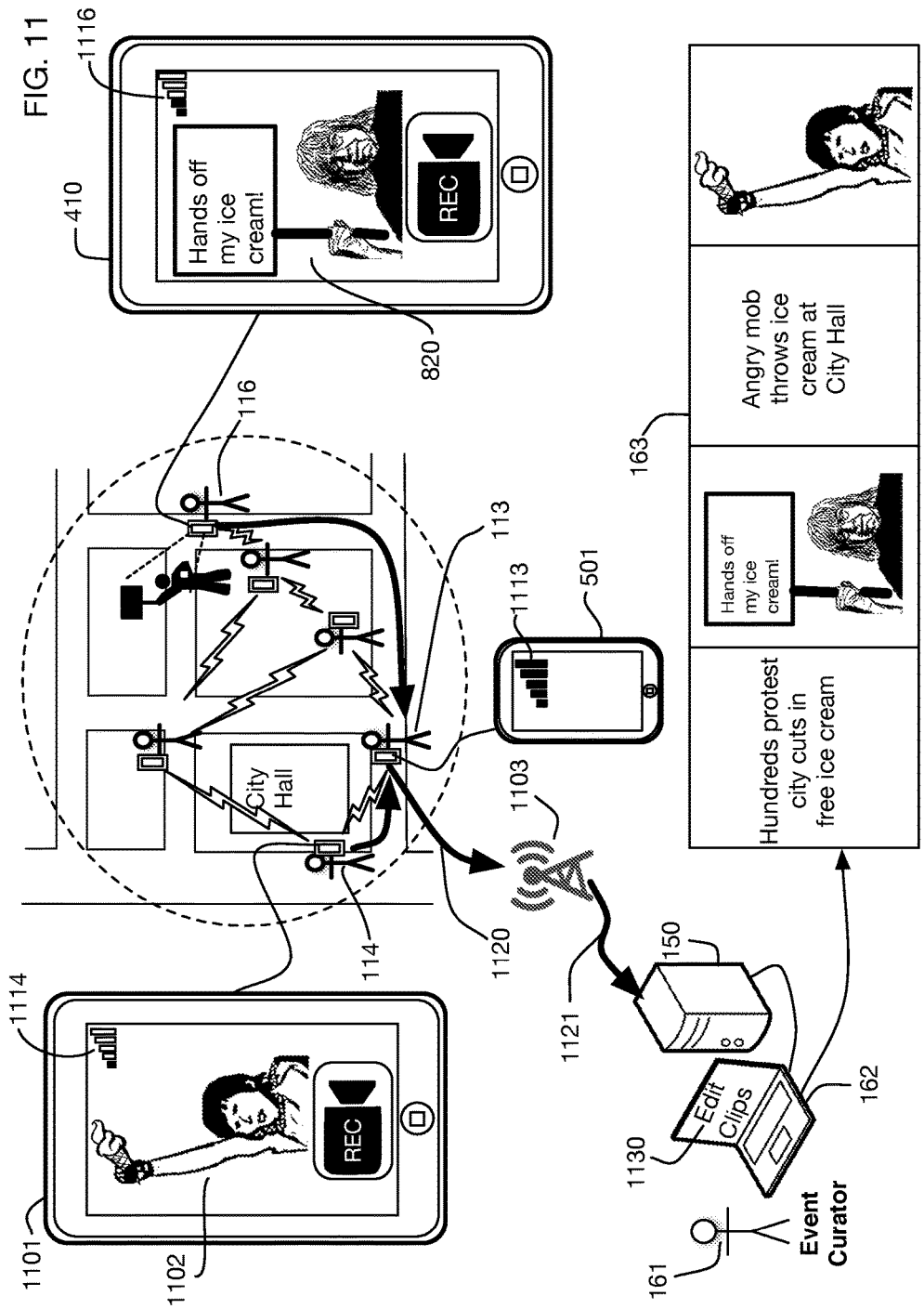
FIG. 11 illustrates an embodiment of the system that uploads media captures to a server, and that provides an event curator station that generates a highlight reel from the combined captures of the event participants.

In one or more embodiments some or all of the media captured by participants may be transmitted to one or more servers. FIG. 11 illustrates an embodiment with a server 150 that is configured to receive copies of the media captured by the event participants. In this example, the server is not located within the event area, and is therefore not directly connected to the peer-to-peer mesh network linking event participants. For illustration, the server is reachable via a cellular network 1103, which then forwards information to the server for example over a wide area network or Internet link 1121. This cellular network connection is illustrative; one or more embodiments may access and transfer media to servers connected via any type or types of networks or gateways. In the example of FIG. 11, the event participant applications connected to the mesh network collectively determine which participant station has the best connection to the cellular network 1103. They then forward media to this station, in order to optimize the speed of media transfer to the server. For example, participant 116 captures video 820, but the participant station 410 for this participant has a relatively poor connection 1116 to the cellular network 1103. Similarly, participant 114 captures video 1102, but the participant station 1101 for this participant has a relatively poor connection 1114 to the cellular network 1103. Therefore, the participant applications executing on stations 410 and 1101 coordinate with other stations on the mesh network to identify a participant station 501 with a good connection 1113 to the cellular network, and they forward media to this station for transfer 1120 to the cellular network. The cellular network then forwards the media over link 1121 to the server. In one or more embodiments there may be more than one participant station that is used for forwarding of media to an external network, for example if several stations have good connections to the external network.

In one or more embodiments media collected on server 150 may be edited, combined, selected, and integrated by one or more event curators. For example, event curator 161 may use an event curator station 162, which accesses server 150 to review the transferred media obtained from event participants. An event curator application 1130 executing on event curator station 162 may provide capabilities to review, filter, sort, edit, combine, rearrange, and otherwise integrate this media into one or more integrated media records, such as for example a video highlight clip 163 that combines selected frames from video 820 and video 1102. In one or more embodiments these integrated media records may be distributed to other servers or services, for example as news feeds or as postings on social media services.

Figure 12:
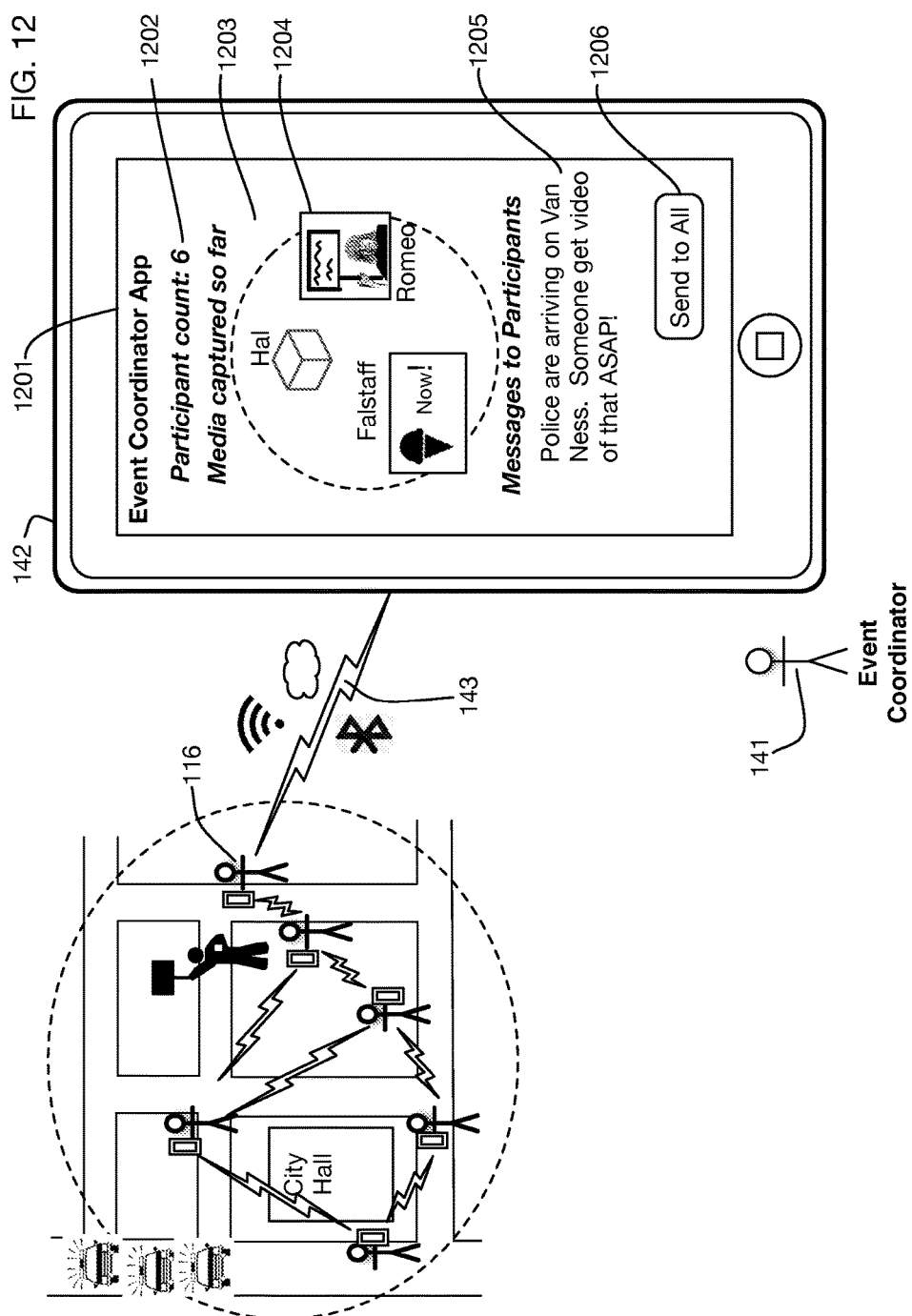
FIG. 12 shows an embodiment of the system that includes an event coordinator, who reviews media captures and provides directives to the participants for additional captures.

In one or more embodiments, an event coordinator or multiple event coordinators may interact with event participants during an event, for example to coordinate the participants' capture of media documenting the event. FIG. 12 illustrates an example with an event coordinator 141. The coordinator 141 uses event coordinator station 142, which executes event coordinator application 1201. The coordinator station 142 is connected to the mesh network via link 143 to the participant station for participant 116. This link may be for example a Bluetooth connection or a Wi-Fi connection if the coordinator is within or near the geographic area for the event. In one or more embodiments an event coordinator may be remote from the event area, in which case the coordinator may be linked to the mesh network via a wide area connection, a cellular connection, or any other network link. The event coordinator application 1201 may display any information to allow the coordinator to monitor the activities of the event participants. For example, the illustrative user interface of application 1201 displays the number of participants 1202, and a map 1203 showing representations of media captured by the event participants. As with the event participant application described above, the coordinator may for example request full-size copies of media from the participant stations. The coordinator application may also provide an interface to enter messages and directives such as message 1205 that may be sent to participants using controls such as control 1206. Messages may be sent to all participants, or to selected participants. Directives and messages may for example suggest additional media captures to document the event, such as captures of additional persons, places, activities, locations, or captures from different angles or positions, or captures using different types of media.

Figure 13:
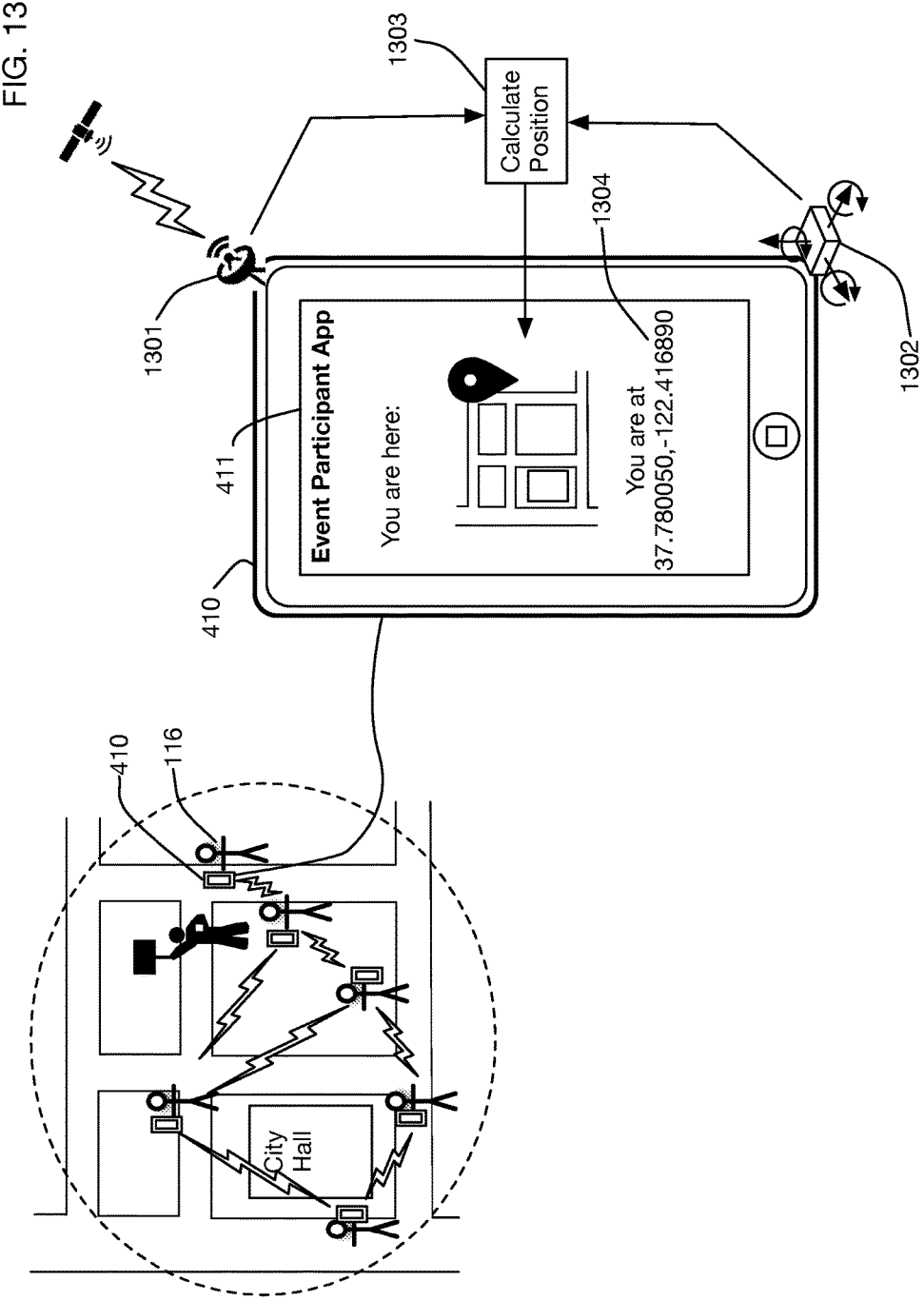
FIG. 13 shows an embodiment of the system that calculates the location of a participant station using one or both of a GPS receiver and a motion sensor.

Event participant stations and event participant applications may use various technologies and methods to determine the location of a participant. FIG. 13 illustrates an embodiment that uses one or both of a GPS receiver and a motion sensor to determine a participant's location. Participant 116 uses participant station 410, which includes one or both of GPS receiver 1301 and motion sensor 1302. In one or more embodiments the GPS receiver data may be augmented for example with cellular network information to improve the estimate of the participant's location. Motion sensor 1302 may for example include any combination of accelerometers, gyroscopes, magnetometers, or any other sensors that measure any aspects of the user's motion, position, or orientation. Information from the GPS receiver 1301 or the motion sensor or sensors 1302 may be input into a position calculation module 1303, which calculates the user's position 1304. In the illustrative participant application 411, the position is also displayed on a map. Data from GPS 1301 and motion sensor 1302 may be combined to form a location estimate using techniques known in the art, such as for example a Kalman filter.

Figure 14:
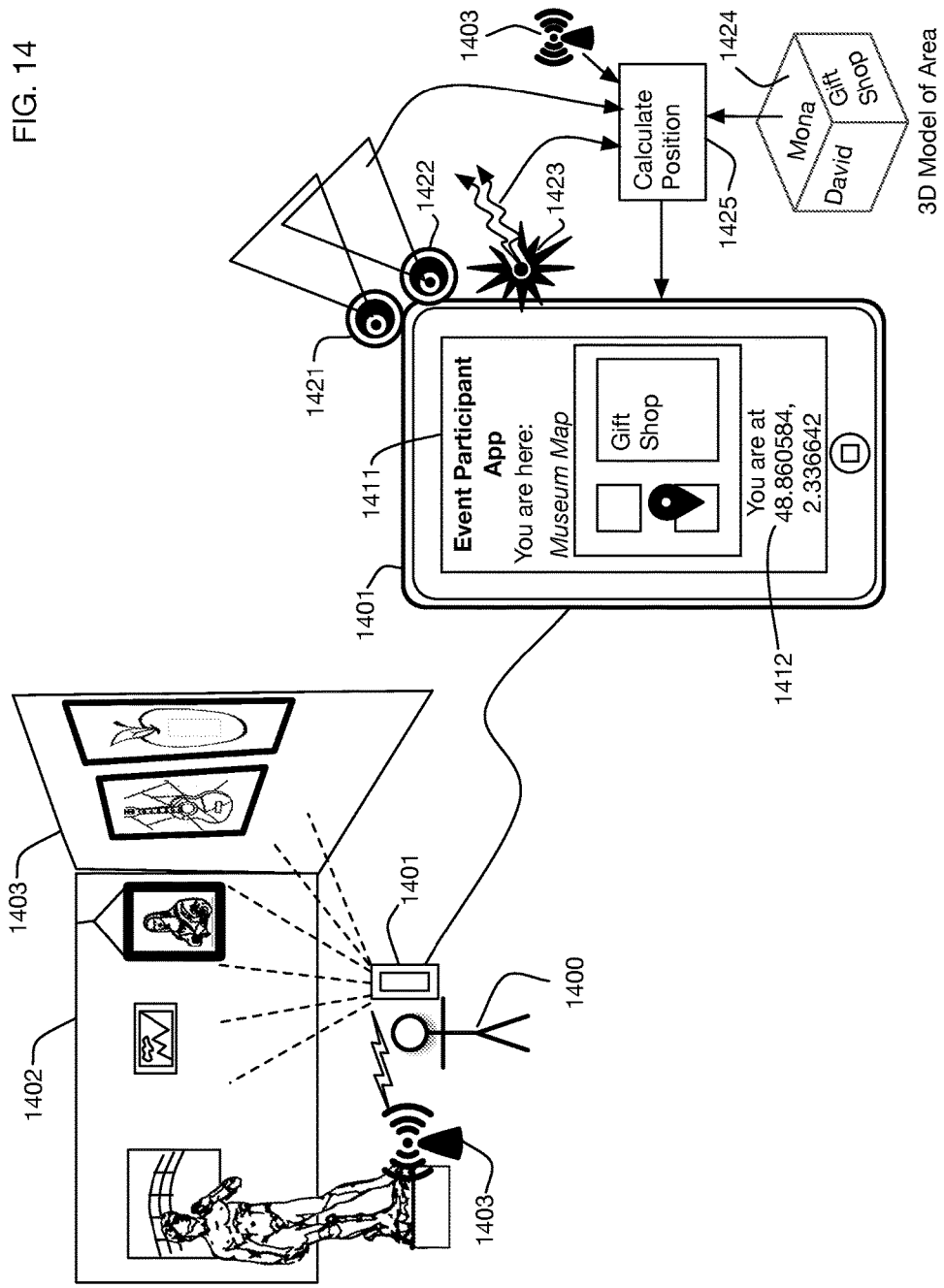
FIG. 14 shows an embodiment of the system that calculates the location of a participant in an indoor environment, using a combination of camera images, 3D sensing data, beacons, and a 3D model of the environment.

Location sensors such as GPS sensor 1301 may in some cases be ineffective for calculating the participant's location. For example, GPS receivers may not always function indoors. In addition, the resolution of a GPS location estimate may be relatively coarse, even when augmented with cellular network information. Therefore, one or more embodiments may use additional technologies and techniques to estimate a user's location, instead of or in addition to the technologies and techniques illustrated in FIG. 13. FIG. 14 illustrates an embodiment that uses technologies that may work effectively in indoor environments even if a GPS signal is not available. Event participant 1400 is indoors, in this example in a museum. The participant station 1401 scans the environment in the vicinity of the station using for example cameras and 3D sensors integrated into or coupled to the participant station. For example, the cameras or sensors or both may scan the museum walls 1402 and 1403 to determine their shape and appearance. Station 1401 may also receive signals from one or more beacons such as beacon 1403, which may for example be located near specific points of interest. Cameras may for example be a monoscopic camera, or a stereo camera with two lenses 1421 and 1422. A 3D sensor may for example be a LIDAR 1423, or a similar technology such as an ultrasonic rangefinder. The participant application 1411 executing on participant station 1401 may combine data from any combination of inputs 1421, 1422, 1423 and beacons such as 1403 to perform a position calculation 1425. This calculation may access a 3D model 1424 of an area, such as for example a model of an indoor area. A 3D model may include information on either or both of the shape and appearance of the area, and information on the location and identity of beacons within the area. By comparing inputs captured by cameras, 3D sensors, and beacon signal receivers to the 3D model, the calculation 1425 may determine the position of the participant station relative to the modeled area. The 3D model 1424 may for example model any area or structure, including for example, without limitation, a building, a room, a set of rooms, a hall, a stadium, a museum, a hotel, an airport, a train station, an airplane, a train, a bar, a restaurant, an office building, a warehouse, a house, an apartment, a nightclub, a gym, a mall, a store, and a subway. In one or more embodiments a 3D model may model an indoor area, an outdoor area, or a combination thereof. The 3D model 1424 may be obtained from a server, obtained from the event organizer, or distributed from an access point within the event area to each participant when the participant arrives in the event area. For example, for an event in a restaurant, the restaurant may have a 3D model that has been generated previously (by the restaurant itself or by others), and this model may be transmitted to event participants when they arrive in the restaurant.

In one or more embodiments a 3D model of an event area may be generated by the event organizer. FIG. 15 illustrates an embodiment of the system with event organizer 101 using event organizer station 102 to capture information about the event area. The event organizer station 102 may for example include cameras or 3D sensors such as those illustrated in FIG. 14 for the event participant station. The event organizer may for example obtain information about an event area from various locations and orientations, by moving through the event area and capturing images, 3D sensor data, beacon signals, or any combination thereof. In FIG. 15, organizer 101 first captures information by scanning walls 1402 and 1403; the organizer then moves 1501 to a different room and scans walls 1502 and 1503, and object 1504. Scanning an area may involve for example any or all of capturing camera images, obtaining depth information using a 3D sensor, triangulating on beacon signals, estimating distances to beacons using signal strength, and tracking the organizer's trajectory through the area using motion sensors. A combination of this information may then be used to generate an integrated 3D model 1424 of the event area. In one or more embodiments this 3D model 1424 may be transmitted 1511 to event participants 1510, for example with other details of the event.

FIG. 16 continues the example of FIG. 15 to illustrate event participants in the event area during the event. Participants 1601 and 1603 have received the 3D model 1424 of the event area from the event organizer; this model may be stored for example on each event participant station. The event participant applications used by these participants may compare the data captured by the participant stations to the 3D model to determine each participant's location within the event area. For example, participant 1601 uses event participant station 1602 to scan walls 1402 and 1403 in the immediate vicinity of the participant; data from these scans, in conjunction with the 3D model, may be used to determine or refine the location of the participant within the event area. Similarly, event participant 1603, who is in a different room, uses participant station 1604 to scan walls 1502 and 1503 and object 1504 to determine the participant's location. Participants 1601 and 1603 share their locations over mesh network link 1610, which may be for example a Bluetooth link. Each participant station may display the 3D model of the event area along with the locations of the participants. For example, event participant station 1602 running event participant application 1620 shows a map 1621 of the event area, which may be based for example on the 3D model received from the event organizer. The location of each participant may be shown on the map, such as location 1622 for participant 1601 and location 1623 for participant 1603. Participants may be labelled for example with one or both of the participant's name and an icon or avatar representing the participant. By using the 3D model of the event area, which may be generated by the event organizer, participants may be able to track and find one another during the event. This tracking and locating may be possible even without radio signals to GPS or cellular transmitters, by using indoor area recognition technologies such as image processing, 3D sensing, and beacons.

While the invention herein disclosed has been described by means of specific embodiments and applications thereof, numerous modifications and variations could be made thereto by those skilled in the art without departing from the scope of the invention set forth in the claims.

What is claimed is:

1. A collaborative media capture and sharing system, comprising
an event organizer station, comprising an organizer application configured to execute on an electronic computing device used by an event organizer, wherein said organizer application is configured to
define a geographical area for an event;
define a time range for said event;
transmit a notification of said event to a plurality of event participants, wherein said notification of said event comprises said geographical area for said event and said time range for said event;
a plurality of event participant stations, each comprising a participant application configured to execute on a mobile computing device used by an event participant of said plurality of event participants, wherein said participant application is configured to
obtain a location of said mobile computing device;
receive said notification of said event from said organizer application;

display said notification of said event;
when said location of said mobile computing device is within said geographical area for said event, at a time that is within said time range for said event,
join a mesh network that connects participant applications associated with event participants that are within said geographic area for said event, wherein said mesh network uses peer-to-peer connections between nodes;
capture one or more media records of said event;
tag each media record of said one or more media records of said event with one or more descriptive tags comprising
a time at which said media record was captured;
a location at which said media record was captured; and
an identity of said event participant;
store said each media record and said one or more descriptive tags on a memory associated with said mobile computing device;
share a representation of said one or more media records and descriptive tags with one or more other event participants over said mesh network;
display a representation of one or more media records and descriptive tags shared by said one or more other event participants.

2. The collaborative media capture and sharing system of claim 1, wherein
said event comprises one or more of a wedding, a concert, a political protest, a search and rescue operation, a criminal activity, an emergency, a natural phenomenon, a law enforcement operation, a military operation, a sporting event, a trip, a vacation, an outing, a field trip, a party, a fair, a festival, a rally, a riot, a geocaching game, a farmer's market, a trade show, a conference, a convention, and a meeting; and,
wherein said one or more media records comprise one or more of
a photo, a panorama, a video, a 360-degree video, a virtual reality video, an audio recording, a 3D scan, a 3D photograph and a 3D video;
wherein said peer-to-peer connections comprise one or more of Wi-Fi connections and Bluetooth connections.

3. The collaborative media capture and sharing system of claim 1, wherein said participant application is further configured to
transmit said location of said mobile computing device to one or more participant applications associated with said one or more other event participants over said mesh network;
receive locations of the mobile computing devices associated with said one or more other event participants over said mesh network;
display said locations of the mobile computing devices associated with said one or more other event participants;
display a notification when a mobile computing device associated with an event participant of said one or more other event participants enters or leaves said geographical area for said event.

4. The collaborative media capture and sharing system of claim 1, wherein said participant application is further configured to
accept a message from said event participant;
accept a distribution list for said message from said event participant, wherein said distribution list comprises one or more of a broadcast address that indicates all event participants within said geographical area;
a list of one or more of said one or more other event participants;
transmit said message to said distribution list over said mesh network.

5. The collaborative media capture and sharing system of claim 1, wherein said participant application is further configured to
accept a panic input from said event participant;
when said event participant provides said panic input, generate a panic message and transmit said panic message to one or more of said one or more other event participants over said mesh network.

6. The collaborative media capture and sharing system of claim 5, wherein said participant application is further configured to transmit said panic message to one or more of said one or more other event participants whose locations are closest to said location of said mobile computing device associated with said event participant.

7. The collaborative media capture and sharing system of claim 1, wherein said participant application is further configured to
receive a location of one or more points of interest within said geographical area;
when said location of said mobile computing device is at or near a point of interest of said one or more points of interest, display information associated with said point of interest.

8. The collaborative media capture and sharing system of claim 7, wherein
said one or more points of interest comprise one or more of a restaurant, a bar, a café, a pub, a food truck, a grocery store, a retail shop, a gallery, a spa, a museum, a historical landmark, a monument, and a geographic feature;
wherein said information associated with said point of interest comprises one or more of an advertisement, a promotion, a discount, a reward, a bonus, and a gift; and,
wherein said representation of said one or more media records comprise a reduced size version of said one or more media records wherein said reduced size version of said one or more media records comprises one or more of
a clip selected from a video capture;
a frame selected from a video capture;
a thumbnail of a frame selected from a video capture;
a reduced resolution version of a photo capture;
a black and white version of a color photo capture;
a reduced fidelity version of an audio capture.

9. The collaborative media capture and sharing system of claim 1, wherein said participant application is further configured to
accept a selection from said event participant of one or more media records for which the event participant wishes to receive a full size version of said one or more media records;
transmit a request for said full size version of said one or more media records to a participant application that captured said one or more media records.

10. The collaborative media capture and sharing system of claim 1, wherein said participant application is further configured to upload said one or more media records and said one or more descriptive tags to a server; and,
wherein said participant application is further configured to determine whether to establish a direct connection to said server and transmit said one or more media records and said one or more descriptive tags over said direct connection, or locate a different participant application with a superior connection to said server and transmit said one or more media records and said one or more descriptive tags to said different participant application over said mesh network to be forwarded to said server.

11. The collaborative media capture and sharing system of claim 10, further comprising a curation application coupled to said server and configured to generate an integrated media record for said event that combines selected media records generated by participant applications associated with said plurality of event participants.

12. The collaborative media capture and sharing system of claim 1, further comprising an event coordinator station, comprising a coordinator application configured to execute on an electronic computing device used by an event coordinator, wherein said coordinator application is configured to during said event, receive said representation of said one or more media records and descriptive tags from said plurality of event participants;

display said representation of said one or more media records and descriptive tags from said plurality of event participants;

accept one or more directives for additional media capture from said event coordinator;

transmit said one or more directives for additional media capture to said plurality of event participants.

13. The collaborative media capture and sharing system of claim 12, wherein said one or more directives for additional media capture comprise one or more of a region or location within said geographic area for which additional media capture is desired;

a person or group of persons for which additional media capture is desired;

a topic for which additional media capture is desired;

an angle or perspective of a location or person for which additional media capture is desired;

a media type for which additional media capture is desired.

14. The collaborative media capture and sharing system of claim 12, wherein said event coordinator application is further configured to join said mesh network that connects participant applications;

receive said representation of said one or more media records and descriptive tags over said mesh network;

transmit said one or more directives for additional media capture over said mesh network.

15. The collaborative media capture and sharing system of claim 1, wherein said obtain said location of said mobile computing device comprises obtain location data from a GPS receiver coupled to said mobile computing device.

16. The collaborative media capture and sharing system of claim 1, wherein said obtain said location of said mobile computing device comprises obtain motion sensor data from one or more motion sensors coupled to said mobile computing device;

calculate said location of said mobile computing device from said motion sensor data.

17. The collaborative media capture and sharing system of claim 1, wherein said obtain said location of said mobile computing device comprises obtain information about a vicinity of said mobile computing device, wherein said information about said vicinity comprises one or more of one or more camera images of said vicinity;

one or more 3D sensor readings of said vicinity;

one or more beacon identities within said vicinity;

correlate said information about said vicinity with a model of an environment to determine said location of said mobile phone in said environment.

18. The collaborative media capture and sharing system of claim 17, wherein said event organizer application is further configured to generate said model of said environment;

transmit said model of said environment to said plurality of event participants.

19. The collaborative media capture and sharing system of claim 18, wherein said generate said model of said environment comprises obtain information about said environment comprising one or more of one or more camera images of said environment;

one or more 3D sensor readings of said environment;

create a three-dimensional model of said environment based on said information about said environment.

20. The collaborative media capture and sharing system of claim 19, wherein said participant application is further configured to receive said model of said environment from said event organizer application;

display a map of said model of said environment;

transmit said location of said mobile computing device to one or more participant applications associated with said one or more other event participants over said mesh network;

receive locations of the mobile computing devices associated with said one or more other event participants over said mesh network;

display said locations of the mobile computing devices associated with said one or more other event participants on said map of said model of said environment.

* * * * *